United States Patent
Liong et al.

(10) Patent No.: US 7,386,630 B2
(45) Date of Patent: Jun. 10, 2008

(54) USING POLICY-BASED MANAGEMENT TO SUPPORT DIFFSERV OVER MPLS NETWORK

(75) Inventors: Yin Ling Liong, Woburn, MA (US); Roberto Barnes, Espoo (FI); Man Li, Bedford, MA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/719,371

(22) Filed: Nov. 21, 2003

(65) Prior Publication Data

US 2004/0221051 A1    Nov. 4, 2004

Related U.S. Application Data

(60) Provisional application No. 60/467,233, filed on Apr. 30, 2003.

(51) Int. Cl.
*G06F 15/173* (2006.01)
*G06F 15/16* (2006.01)

(52) U.S. Cl. .................. 709/238; 709/236; 709/240

(58) Field of Classification Search ............ 709/230, 709/200, 201, 238, 239, 245, 236, 240, 223; 370/392, 352, 230, 252, 231, 395, 400, 389; 713/153
See application file for complete search history.

(56) References Cited

U.S. PATENT DOCUMENTS

| | | | | |
|---|---|---|---|---|
| 6,104,700 A * | 8/2000 | Haddock et al. | ............ | 370/235 |
| 6,154,776 A * | 11/2000 | Martin | ............ | 709/226 |
| 6,167,445 A * | 12/2000 | Gai et al. | ............ | 709/223 |
| 6,170,009 B1 * | 1/2001 | Mandal et al. | ............ | 709/223 |
| 6,408,001 B1 * | 6/2002 | Chuah et al. | ............ | 370/392 |
| 6,522,627 B1 * | 2/2003 | Mauger | ............ | 370/230 |
| 6,611,532 B1 * | 8/2003 | Madour et al. | ............ | 370/466 |
| 6,625,650 B2 * | 9/2003 | Stelliga | ............ | 709/226 |
| 6,665,273 B1 * | 12/2003 | Goguen et al. | ............ | 370/252 |
| 6,678,264 B1 * | 1/2004 | Gibson | ............ | 370/352 |
| 6,680,943 B1 * | 1/2004 | Gibson et al. | ............ | 370/392 |
| 6,741,595 B2 * | 5/2004 | Maher et al. | ............ | 370/392 |
| 6,751,729 B1 * | 6/2004 | Giniger et al. | ............ | 713/153 |
| 6,775,280 B1 * | 8/2004 | Ma et al. | ............ | 370/392 |
| 6,778,496 B1 * | 8/2004 | Meempat et al. | ............ | 370/230 |
| 6,778,498 B2 * | 8/2004 | McDysan | ............ | 370/231 |

(Continued)

OTHER PUBLICATIONS

Westerinen, A. et al.: "Terminology for Policy-Based Management", RFC3198 (2001).

(Continued)

*Primary Examiner*—William Vaughn
*Assistant Examiner*—Kristie D Shingles
(74) *Attorney, Agent, or Firm*—Squire, Sanders & Dempsey, L.L.P.

(57) ABSTRACT

A policy server operates to configure differentiated services over multi-protocol label switching (Diffserv/MPLS) in a communications network. The policy server enables the definition and deployment of a customer policy, a network policy and a mapping policy. The policy server is arranged to create a group of MPLS tunnels, and associate the tunnels to the mapping policy and the customer policy. The customer policy includes a tunnel group identifier and a tunneling mode, and maps customer traffic to MPLS tunnels. The policy server translates the customer policy, the network policy and the mapping policy into device-specific commands, and then deploys the device-specific commands to the network interfaces of the affected network devices.

23 Claims, 9 Drawing Sheets

U.S. PATENT DOCUMENTS

| | | | |
|---|---|---|---|
| 6,791,985 B1* | 9/2004 | Ashwood-Smith et al. | 370/395.5 |
| 6,856,676 B1* | 2/2005 | Pirot et al. | 379/201.01 |
| 6,940,864 B2* | 9/2005 | Abdelilah et al. | 370/412 |
| 6,968,389 B1* | 11/2005 | Menditto et al. | 709/233 |
| 7,032,022 B1* | 4/2006 | Shanumgam et al. | 709/225 |
| 7,046,680 B1* | 5/2006 | McDysan et al. | 370/396 |
| 7,116,665 B2* | 10/2006 | Balay et al. | 370/392 |
| 7,120,150 B2* | 10/2006 | Chase et al. | 370/395.1 |
| 2003/0053464 A1* | 3/2003 | Chen et al. | 370/400 |
| 2003/0185217 A1* | 10/2003 | Ganti et al. | 370/395.5 |
| 2003/0231640 A1* | 12/2003 | Basso et al. | 370/401 |
| 2004/0028054 A1* | 2/2004 | Khurana et al. | 370/395.21 |
| 2004/0081197 A1* | 4/2004 | Liu | 370/468 |
| 2004/0117613 A1* | 6/2004 | Edmondson | 713/150 |
| 2004/0213264 A1* | 10/2004 | Mistry et al. | 370/395.7 |
| 2004/0258056 A1* | 12/2004 | Ishihara et al. | 370/386 |
| 2005/0018605 A1* | 1/2005 | Foote et al. | 370/230 |
| 2005/0088977 A1* | 4/2005 | Roch et al. | 370/254 |
| 2006/0073835 A1* | 4/2006 | Antoniou et al. | 455/450 |

OTHER PUBLICATIONS

Flegkas, P. et al.: "A policy-Based Quality of Service Management System for IP Diffserv Networks" IEEE Network Magazine (2002).

Akyildiz, I.F. et al.: "A New Traffic Engineering Manager for Diffserv/MPLS Networks: Design and Implementation on an IP QoS Testbed", Computer Communications 26 (2003) pp. 388-403.

Trimintzios, P. et al.: "A Management and Control Architecture for Providing IP Differentiated Services in MPLS-based Network", IEEE Communication Magazine, Special Issue in IP Operations and Management, vol. 39, No. 5 (2001) pp. 80-88.

Jacobson, V. et al.: "An Expedited Forwarding PHB", RFC 2598, IETF (1999).

Faucheur, F.L. et al.: "MPLS Support of Differentiated Services", RFC 3270, IETF (2002).

Bernet, Y. et al.: "An Informal Management Model for Diffserv Routers", RFC 3290, IETF (2002).

Katz, D. et al.: "Traffic Engineering Extensions to OSPF", draft-katz-yeung-ospf-traffic-09.txt, IETF Internet Draft (2002).

Li, T. et al.: "IS-IS-Extensions for Traffic Engineering", draft-ietf-isis-traffic-04.txt, Internet Draft (2001).

Faucheur, F.L., et al.: "Requirements for Support of Diff-Serv-Aware MPLS Traffic Engineering", draft-ietf-tewg-diff-te-reqts-07.txt, IETF Internet Draft (2003).

Faucheur, F.L. (ed.): "Protocol Extensions for Support of Diff-Serve-Aware MPLS Traffic Engineering", draft-ietf-tewg-diff-te-proto-03.txt, IETF Internet Draft (2003).

Bruce Davie & Yakov Rekhter "MPLS Technology and Applications" pp. 147-170, Morgan Kaufmann Publishers, San Francisco, CA (2000).

* cited by examiner

USING POLICY-BASED MANAGEMENT TO SUPPORT DIFFSERV OVER MPLS NETWORK

CROSS REFERENCE TO RELATED APPLICATIONS

This application claims benefit under 35 United States Code § 119(e) of U.S Provisional Application No. 60/467,233 filed on Apr. 30, 2003.

FIELD OF THE INVENTION

This invention relates to communication networks, and data packet routing in such networks.

BACKGROUND

A communication network can be made from a group of routers, switches, and other related devices. Some of these devices are interconnected.

In communication networks, data is transmitted in the form of individual packets. The data packets are transmitted from one device to the next. Each packet is made from bits. Some bits are the payload, meaning they encode the information that is to be transmitted. Other bits are part of a header, which encodes information such as where the packet is to be transmitted to.

FIG. 1 shows communication network 100. Network 100 includes devices at its nodes, some of which are shown as dots, and interconnections between the devices that are shown as lines joining the dots. The devices of network 100 make frequent decisions as to how to route the data packets, i.e. upon receiving a packet, which device to forward it to next.

Normally routing and packet treatment decisions are made by network 100 automatically. Absent other distinguishing inputs, network 100 treats all incoming packets the same. For example, some Interior Gateway Protocols (IGP), such as open shortest path first (OSPF) and intra-domain intermediate system to intermediate system routing protocol (IS-IS), route IP packets based only on the destination address and the shortest path to reach the destination.

Protocols and functionalities have emerged for making such packet treatment and routing decisions in more sophisticated ways. One of them is called Differentiated services (Diffserv), and another is called Multi-protocol label switching (MPLS).

Network 100 uses Diffserv functionality 110. Differentiated services (Diffserv) provides a scalable Quality of Service (QoS) support for internet protocol (IP) networks. Packet traffic is classified and conditioned at the edge of the network by edge devices, such as edge routers or gateways. A Diffserv code point (DSCP) is then applied to the IP header of each packet. Core routers of the network handle packets in different traffic streams by forwarding them with different per-hop behaviors (PHB). The PHB to be applied is indicated by the DSCP in each packet header. When using Diffserv, many traffic streams can be aggregated to a small number of behavior aggregates that are each forwarded using the same PHB at core routers. Thus, Diffserv functionality 110 simplifies the processing and storage requirements at core routers.

Network 100 also uses MPLS functionality 120. Multi-protocol label switching (MPLS) is a packet-forwarding technology that gives IP operators a high degree of control over the paths taken by packets on their networks. MPLS thus enables an operator to better utilize the network resources, while providing a wide range of services to users. MPLS may be used for traffic engineering, Virtual Private Network (VPN) services, fault-tolerance protection, and the like. Ingress routers at the edge of an MPLS domain classify incoming IP packets into one of the available forward equivalent classes (FEC) or groups of packets. The similarly classified packets are then forwarded in the same manner (i.e., follow the same path) inside the domain. That path, considered unidirectionally, is defined as a label switched path (LSP). LSPs can be configured by using label distribution protocols (LDPs) such as resource reservation protocol with traffic engineering extensions (RSVP-TE) and constraint based routing label distribution protocol (CR-LDP). A setup priority and holding priority may be associated with an LSP. The setup priority defines the priority of the LSP during setup, whereas the holding priority defines the pre-emption priority of the LSP.

Accordingly, MPLS traffic engineering allows administrators to establish routes for certain customers based on information other than the shortest path, such as delay and bandwidth available along the path. Therefore, MPLS can relieve congestion and maximize bandwidth utilization by allowing multiple paths between source and destination.

MPLS, however, does not define or contain QoS services. Therefore, combining MPLS with Diffserv is desirable, as it would enable a MPLS functionality that also performs with IP QoS support.

As can be seen from arrows 130, Diffserv functionality 110 does not work easily with MPLS functionality 120. In order to support the two solutions concurrently, cumbersome mappings between Diffserv and MPLS policies have been attempted. To support interworking, administrators have to identify the MPLS edges and configure the edge devices through element management. In other words, administrators have to configure the edge devices one by one, and issue device-specific commands to support E-LSP and different tunnelling mode.

Moreover, to the inventors' knowledge, currently there is no commercial solution addressing the policy management of Diffserv over MPLS with regards to the configuration of E-LSP and tunnelling mode. There would be many challenges in supporting Diffserv/MPLS policy management due to different recommendations from the standards, and the limited capabilities supported at the network elements.

Two standards for supporting the interoperability of Diffserv and MPLS are: EXP-inferred-PHB scheduling class LSP (E-LSP), and label-only-inferred-PHB scheduling class LSP (L-LSP). An E-LSP uses the experimental (EXP) field in the MPLS shim header to infer the PHB of a packet. An L-LSP uses the MPLS label to carry the Per-hop Scheduling Class (PSC) and the EXP field to convey the PHB.

Two essential elements serve the interoperability Diffserv/MPLS: EXP-to-PHB mapping and tunneling mode. To support E-LSP, an EXP-to-PHB mapping is defined to ensure rule consistency across a network. The mapping is configured into the routers directly, or through RSVP-TE or constraint based routing LDP (CR-LDP) signaling during tunnel set-up. To support L-LSP, the label-to-PSC and EXP-to-PHB mapping is defined. Since the MPLS labels are swapped at every hop, operators are forced to rely on signaling to set the label and EXP mapping. Tunneling mode defines the method of translating the Diffserv information in the MPLS headers (labels and EXP field) into the DSCP value in the encapsulated IP header when packets exit the MPLS network. There are two essential modes of tunneling: pipe mode and uniform mode. For pipe mode, the egress router keeps the DSCP of the encapsulated IP header. For uniform mode, the egress router overwrites the original DSCP with the Diffserv information contained in the MPLS Shim Header.

BRIEF DESCRIPTION OF THE DRAWINGS

The invention will become more readily apparent from the following Detailed Description, which proceeds with reference to the accompanying drawings, in which.

DETAILED DESCRIPTION

Figure 1:
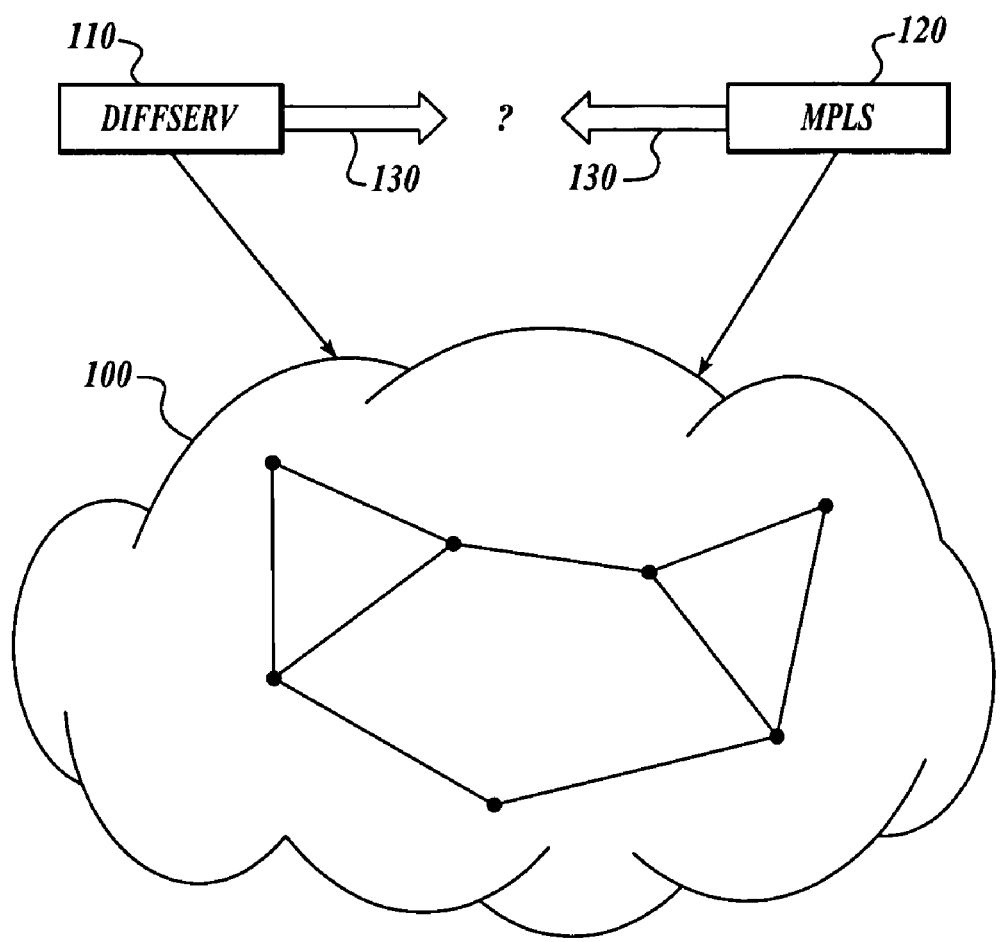
FIG. 1 is a diagram showing a communication network attempting to support a Diffserv functionality and a MPLS functionality.

The present invention is now described. While it is disclosed in its preferred form, the specific embodiments of the invention as disclosed herein and illustrated in the drawings are not to be considered in a limiting sense. Rather, these embodiments are provided so that this disclosure will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The meaning of "a," "an," and "the" may also include plural references. The meaning of "in" includes "in" and "on."

Some particular terms for the present description are also listed to avoid any confusion. The term "packet" refers to an IP (Internet Protocol) packet. The term "flow" means a flow of packets through a network. The term "connection" refers to a flow or flows of packets that share common source and destination, and optionally also a common path. The term "node" refers to a network element that interconnects one or more devices, or even networks. The term "user" refers to any person or customer such as a business or organization that employs a device to communicate or access resources over a network. The term "operator" refers to any technician or organization that maintains or services a packet-based network.

The term "router" refers to a dedicated network element that receives packets and retransmits them, for forwarding them towards their destination. In particular, a router is used to extend or segment networks by forwarding packets from one node to another, or even one logical network to another. A router typically operates at layer 3 and below of the standard Open Systems Interconnection (OSI) reference model for networking. However, some routers can provide additional functionality that operates above layer 3 of the OSI reference model.

Briefly, the present invention provides devices, software and methods for policy based management of two combined functionalities (Diffserv over MPLS) in a single network. Packet-forwarding policies are in place to administer, manage and control access to network resources. In one embodiment, a policy server is employed to implement the management of the network as a whole. The policy server translates business goals or policies into configurations of network resources, and automates the configurations across multiple different network elements and different technologies (e.g. MPLS and Diffserv). The centralized approach ensures policy consistency across multiple network elements. The invention is now described in more detail.

Figure 2:
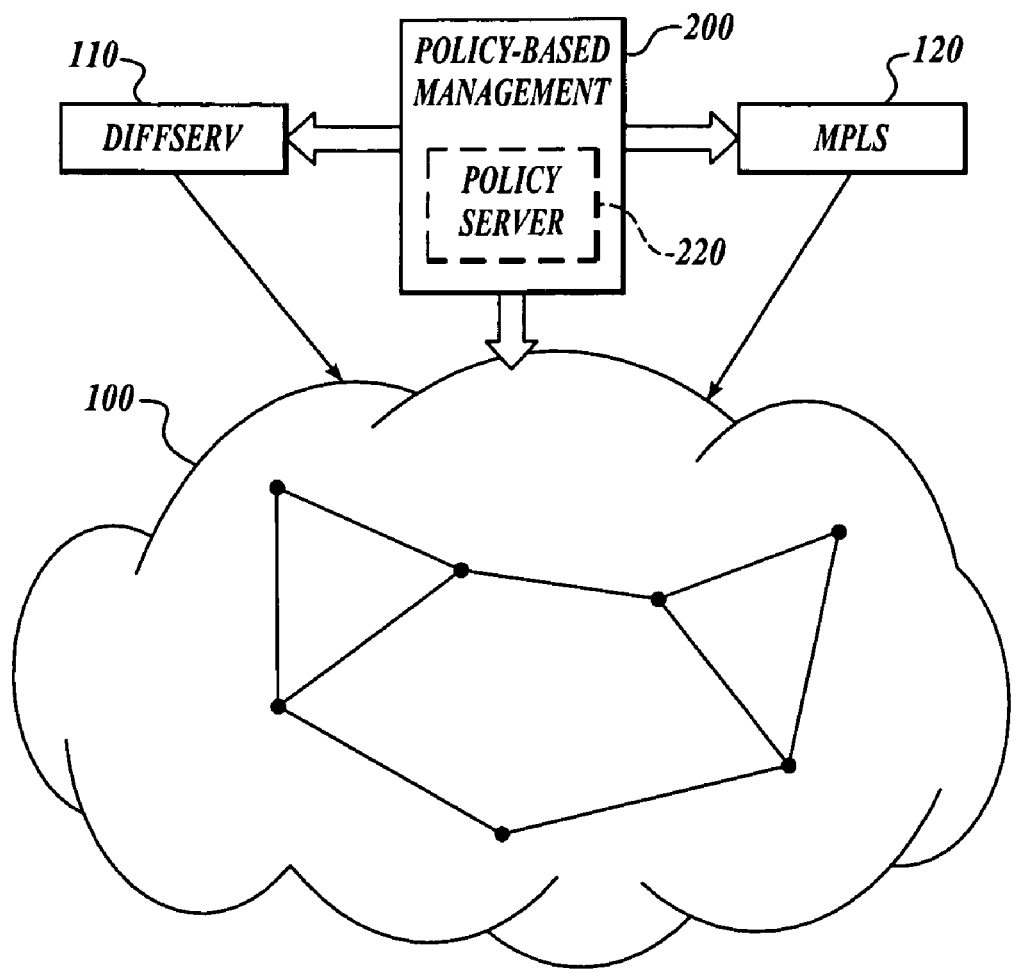
FIG. 2 is a diagram showing how policy based management operates to support the Diffserv functionality and the MPLS functionality in the communication network of FIG. 1 according to the invention.

FIG. 2 shows network 100 of FIG. 1. In addition, policy-based management block 200 according to the invention ensures that Diffserv functionality 110 interoperates well with MPLS functionality 120. Block 200 may be implemented by standalone policy server 220. Alternately, the functionality of server 220 may be implemented by any other suitable device with policy server capability, and which is within or outside network 100, and may or may not have additional assignments.

Block 200 operates to configure differentiated services over multi-protocol label switching (Diffserv/MPLS) in network 100. In broad terms, block 200 operates as a translator to simplify different policy mapping. And once the mapping is defined, the invention automates the deployment of the mapping across the network to simplify the management.

More particularly, block 200 includes a customer policy, a network policy and a mapping policy. Block 200 is arranged to create a group of MPLS tunnels, and associate the tunnels to the mapping policy and the customer policy. The customer policy includes a tunnel group identifier and a tunneling mode, and maps customer traffic to MPLS tunnels. Block 200 then translates the customer policy, the network policy and the mapping policy into device-specific commands, and then deploys the device-specific commands to policy targets. In this case, policy targets are network devices that are to implement the specific routing assignments, and the device specific commands are deployed to the interfaces of such network devices. The network interfaces are arranged to have assigned role names. Interfaces with the same role names will get the same set of rules or policies. Each role name is then associated with a network policy and a customer policy.

Figure 3:
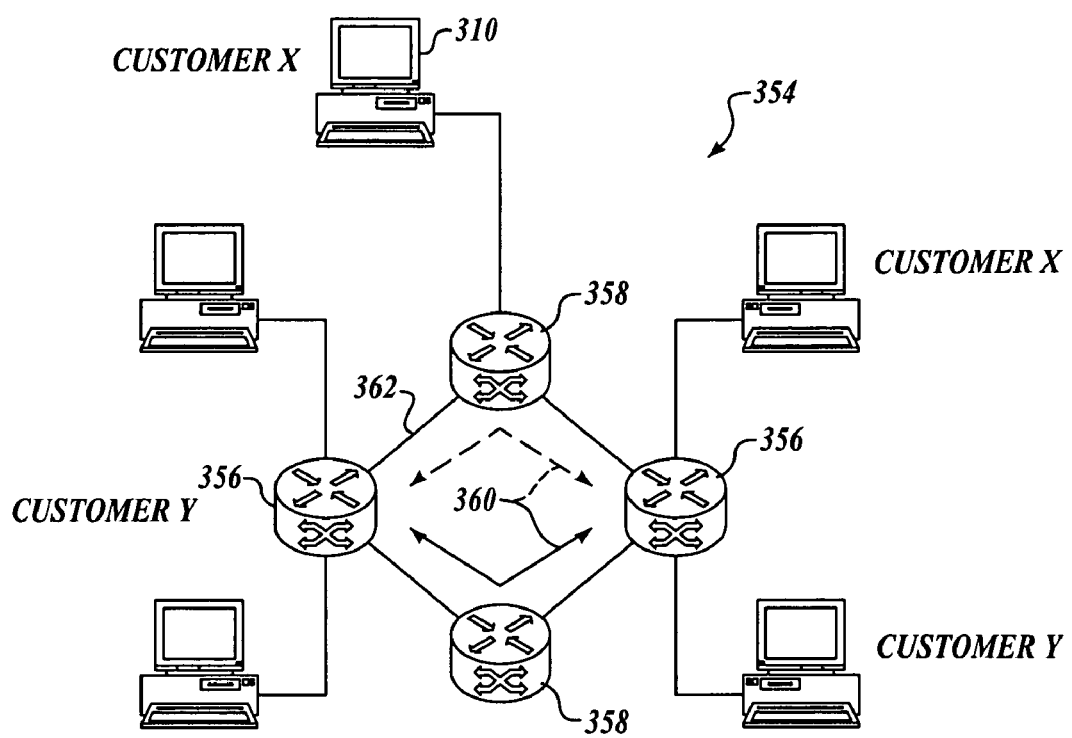
FIG. 3 is a diagram illustrating a particular network implementing a policy server according to the present invention.

FIG. 3 illustrates a diagram of a network implementing a policy server according to aspects of the invention. It will be recognized that network 354 is a particular case of network 100, and policy server 310 is a particular case of policy server 220. Network 354 is to be used by two customers X, Y. Network 354 includes two edge routers 356 and two core routers 358. Policy server 310 can assign different customer applications into different Diffserv classes by service policies, and allocate the resources accordingly by network policies. Such will control which one of the network paths 360 will be followed along one or more communication links 362, for communication within each of customers X, Y.

Figure 4A:
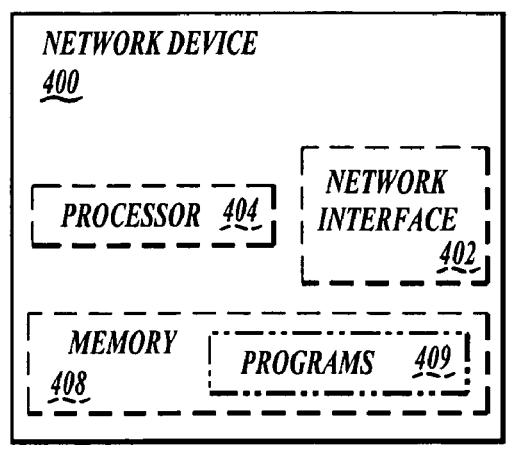
FIG. 4A is a block diagram of a network device.

FIG. 4A is a block diagram of network device 400 made according to an embodiment of the invention. Device 400 may be any network device that can be a policy server. For example, device 400 may be an implementation of policy server 220, 310, etc. Device 400 may be implemented by combining separate components. Alternately, one or more of the components of device 400 may be implemented as an Application Specific Integrated Circuit (ASIC), etc.

Device 400 includes network interface 402 for interfacing with a communications network, such as networks 100, 354, etc. Device 400 also includes processor 404 coupled with network interface 402. Processor 404 may be implemented as a Central Processing Unit (CPU), or any other equivalent way known in the art. In one embodiment, device 400 additionally includes memory 408, on which program 409 may reside. Functions of processor 404 may be controlled by program 409, as will become apparent from the below. Alternately, processor 404 may be implemented as a Digital Signal Processor (DSP), etc.

Figure 4B:
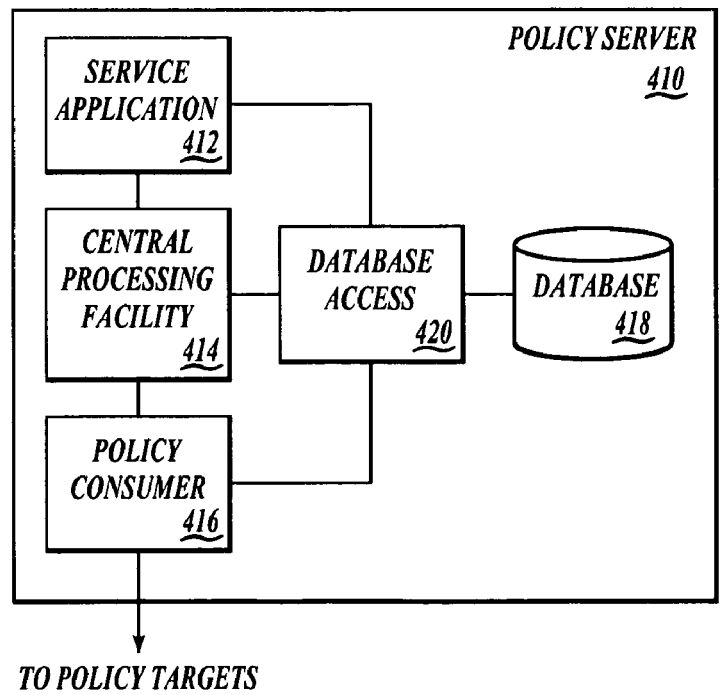
FIG. 4B is a block diagram illustrating an architecture of a policy server according to an embodiment of the invention.

FIG. 4B is a block diagram illustrating the operational architecture of policy server 410 that supports Diffserv over MPLS traffic engineering according to an embodiment of the invention. The architecture of policy server 410 may be used, for example, in implementing policy server 220 of FIG. 2, and/or some of programs 409 of FIG. 4A. Various blocks of the operational architecture may be implemented in software or otherwise, as also described elsewhere in this document.

Policy server 410 includes service application 412, central processing facility 414, and policy consumer 416, all coupled to database 418 through database access block 420. Block 420 provides for read and write operations of database 418. Alternately, database 418 may equivalently be provided as separate from server 410.

Service application 412 includes a graphical user interface (GUI) that allows an IP operator in the future to configure policies interactively. Accordingly, an operator will be able to add, delete or modify policies. Central processing facility 414 translates the policies into device-neutral policy parameters, and stores these parameters in database 418. Central processing facility 414 may also conduct policy verification, conflict detection and resolution. Policy consumer 416 may provide an interface for policy server 410 to communicate with policy targets. A policy target refers to any network device at a network node where the policy is enforced, such as a router. Policy consumer 416 translates the device-neutral policies stored in database 418 into device-specific commands, and deploys the device-specific commands to the policy targets.

According to one embodiment, different types of policies are used including: service policies, network policies, customer policies and mapping policies. Service policies map a service name chosen by an operator to any of the fourteen DSCP numbers defined by Difserv.

Network policies refer to rules that govern the treatment of aggregated traffic, such as queue and scheduler configurations for behavior aggregates. In the case of the present invention, the treatment is the Diffserv treatment of the aggregated traffic. For example, an IP operator may modify service policies when a new service level agreement (SLA) is created or when an existing SLA is modified according to the invention. An IP operator may further modify network policies when new facilities are added into a network or when traffic patterns are changed significantly.

Customer policies define the rules applied to forward certain types of customer traffic. Customer policies include source/destination host groups, application profiles, traffic profiles, service class, policing action and role names. Customer policies can be extended to include a tunnel group identifier and a tunneling mode, when supporting MPLS.

Mapping policies may configure a one-to-one mapping between an EXP field and a unique PHB. The PHB can be identified by a DSCP value. However, there is a limited number of DSCP values, but unlimited number of PHB. If a DSCP value is mapped into multiple PHBs, a different PHB identifier can be defined. For example, a PHB can be identified by a service name.

In a large network, the same set of policies can be applied to multiple routers or network interfaces. To achieve better scalability, network interfaces are assigned role names and the policies are specified and associated with the roles name. Network interfaces identified by the same role names receive the same set of policies.

In one embodiment, a common information model describes policies as relationships between network objects. The information model derives a schema for database 418, such that the policy stored in database 418 is device-neutral. In a multi-vendor environment where routers from different vendors are configured through different protocols, policy server 410 translates the policy stored in database 418 into device-specific commands, and delivers the resulting policy through the specific protocol. The information model enables a consistent provision of policies across multi-vendor networks.

Figure 4C:
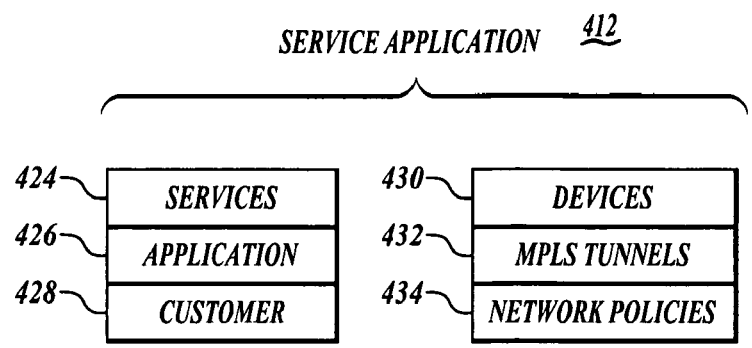
FIG. 4C is a block diagram illustrating an architecture of a service application.

FIG. 4C is a block diagram illustrating an architecture of service application 412 of FIG. 4B according to one embodiment the invention. Service application 412 includes services object 424, application object 426, customers object 428, devices object 430, MPLS tunnels object 432 and network policies object 434. It will be appreciated that it permits IP operators to have substantial input.

Services object 424 allows IP operators to define the services to be provided to customers. In one embodiment, each service is defined as a mapping between a service name and any of the fourteen DSCP numbers defined by the Internet Engineering Task Force (IETF). Application object 426 allows IP operators to define applications for the classification of traffic flows such as protocol, source port and destination port ranges according to the invention. Customer object 428 allows IP operators to define customer policies for each customer. Customer object 428 may also contain host groups and metering profiles associated with each customer. Devices object 430 contains information about network elements that receive the policies from policy server 410. IP operators use devices object 430 to assign role names to the policy targets. Most other policy target information in devices object 430 is directly imported into database 418 from an element management database. MPLS tunnels object 432 allows IP operators to configure the MPLS network components such as tunnel group, explicit routes, CBR (constraint base routing) and EXP-PHB mapping, i.e., MPLS tunnels object 432 specifies the MPLS and Diffserv/MPLS policies. Network policies object 434 allows IP operators to define the network policies that specify the queuing and scheduling treatment of a specific service and that are attached to specific network interfaces.

Figure 4D:
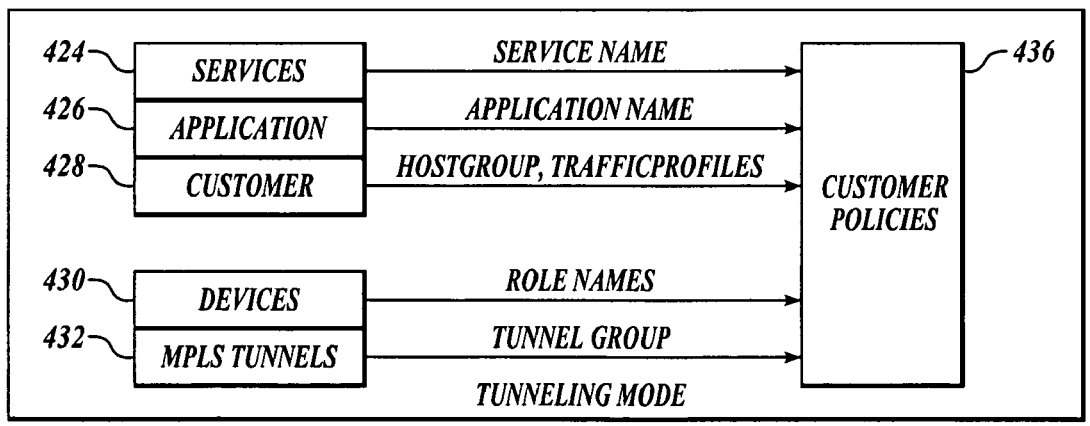
FIG. 4D is a block diagram illustrating an interaction of a customer policies object with other objects in a service application.

FIG. 4D is a block diagram to illustrate the interaction between a customer policies object and other objects in service application 412. Customer policies object 436 includes rules that govern the treatment of individual customer traffic such as classification and metering rules. The classification rules include an application name supplied by application object 426, and source/destination host groups supplied by customer object 428. The metering rules use an algorithm specified by traffic profiles which are supplied to service policies object 436 by customer object 428. Devices object 430 provides the role names to service policies object 436 such that service policies object 436 can be applied to the policy targets. MPLS tunnels object 432 provides information about tunnel group and tunneling mode to customer policies object 436. Customer policies object 436 defines non-conformance action (e.g., marking or dropping) after metering, and maps the traffic into the desired MPLS tunnels and tunneling mode.

Figure 4E:
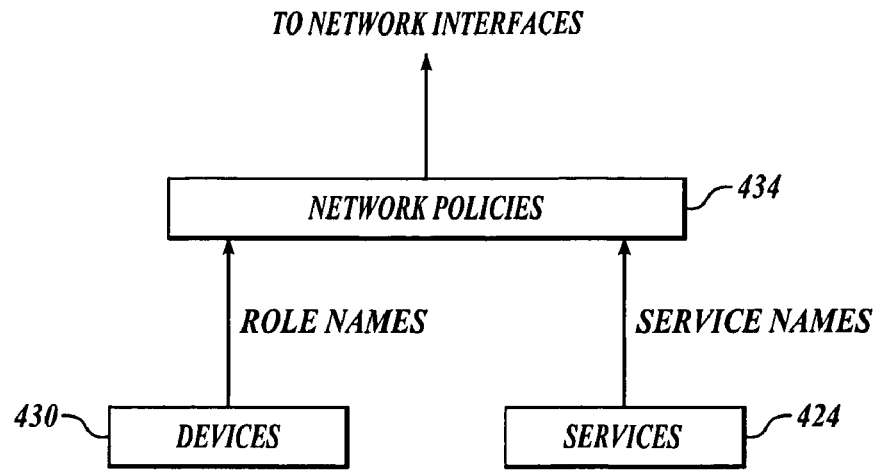
FIG. 4E is a block diagram illustrating an operation of a network policies object.

FIG. 4E is a block diagram illustrating an operation of a network policies object. Devices object 430 allows operators to assign role names to the network interfaces. Network policies object 434 specifies the Diffserv configuration, and applies the configuration to the role names. Network policies object 434 then deploys the network policies to the network interfaces through the associated role names. For example, if network device 400 is used to implement of the network switches, then the policies are deployed to affect network interface 402.

Services object 424 defines the service policies, and thus provides service names to network policies object 434. The service name selects the Diffserv class that supports classified traffic. Network policies object 434 defines the PHB used to support a particular service or Diffserv class, such as queuing and scheduling. In each network interface, all LSPs share the same queue if they have the same PSC, and no per-LSP queuing is employed.

Figure 4F:
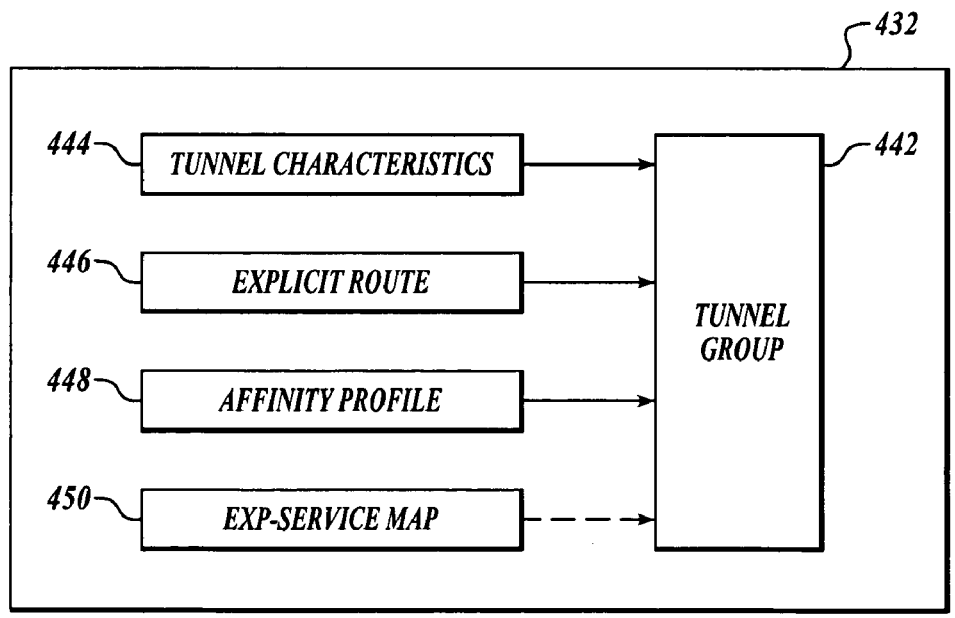
FIG. 4F is a block diagram illustrating the policy elements of a MPLS tunnels object.

FIG. 4F is a block diagram to illustrate policy elements of an MPLS tunnels object. The policy elements include tunnel group 442, tunnel characteristics object 444, explicit route object 446, affinity profile object 448, and EXP-service map 450. Tunnel group 442 is a set of tunnels that share the same properties and form a certain topology, such as a mesh or a star. Tunnel group 442 identifies the tunnels that carry traffic of identified customers. Tunnel group 442 is created by specifying end point devices, and by connecting topology and tunnel specific properties. Tunnel specific properties can include bandwidth, traffic profiles, holding priority, setup priority and route constraints. Tunnel group 442 also serves as an identifier that the different policies associate with, such as the EXP-to-PHB mapping policy. Tunnel group 442 configures (i.e., creates, maintains and deletes) MPLS tunnels such that IP operators do not need to create tunnels individually. Instead, IP operators specify the end-point routers and the inter-connecting topology. The internal routes traversed by a tunnel are determined by the underlying routing protocols, such as OSPF or IS-IS. In the case of star topology, the hub and the spokes are specified explicitly. Tunnel characteristics object 444 includes profiles that specify the parameters for resource reservation and policing per MPLS tunnel. Explicit route object 446 allows IP operators to explicitly specify the desired path for forwarding packets.

The Diffserv/MPLS policy elements include EXP-service map 450 and the linking of tunnel group 442 and tunneling mode in customer policies object 436. EXP-service map 450 allows IP operators to configure the mapping between the EXP field in the MPLS shim header and the services defined in services object 424. Since each service is linked to a DSCP value in the Diffserv network, the mapping also translates the EXP field into a specific DSCP value. Thus, service differentiation is achieved by parsing MPLS shim headers. The static mapping is distributed to all routers during policy deployment, thus limiting the number of Diffserv classes to eight. In order to support more than eight Diffserv classes in the network, EXP-service map 450 can be attached to tunnel group 442, as indicated by the dotted arrow in FIG. 4F.

The linking of tunnel group 442 in customer policies object 436 identifies the LSPs that carry customer traffic. Tunneling mode decides which DSCP code point is carried in the IP headers when a packet exits the MPLS network. Tunnel group 442 and tunneling mode are used if operators use MPLS to carry customer traffic. If MPLS is not used, tunnel group 442 and tunneling mode can be left empty.

In order to decide which network interfaces should receive the Diffserv/MPLS customer policies, the policy server utilizes input/output role names, and the MPLS gateways of the source and destination hosts. The input role names are assigned to the ingress interfaces of the tunnel group's edge devices. The output role names are assigned to the egress interfaces of the tunnel group's edge devices. The customer traffic may enter or leave from one or a subset of the tunnel group's edge devices. Thus, the MPLS gateways of the source and destination host groups are specified to decide which network interfaces the policy deploys to. For example, to map classified traffic into a specific MPLS tunnel, the rule deploys to the ingress interfaces of the source gateways. Similarly, to configure the tunneling mode, the rule deploys to the egress interfaces of the destination gateways.

The present invention may be implemented by one or more devices that include logic circuitry. The device performs functions and/or methods as are described in this document. The logic circuitry may include a processor that may be programmable for a general purpose, or dedicated, such as microcontroller, a microprocessor, a Digital Signal Processor (DSP), etc. For example, the device may be a digital computer like device, such as a general-purpose computer selectively activated or reconfigured by a computer program stored in the computer. Alternately, the device may be implemented an Application Specific Integrated Circuit (ASIC), etc.

Moreover, the invention additionally provides methods, which are described below. The methods and algorithms presented herein are not necessarily inherently associated with any particular computer or other apparatus. Rather, various general-purpose machines may be used with programs in accordance with the teachings herein, or it may prove more convenient to construct more specialized apparatus to perform the required method steps. The required structure for a variety of these machines will become apparent from this description.

In all cases there should be borne in mind the distinction between the method of the invention itself and the method of operating a computing machine. The present invention relates both to methods in general, and also to steps for operating a computer and for processing electrical or other physical signals to generate other desired physical signals.

The invention additionally provides programs, and methods of operation of the programs. A program is generally defined as a group of steps leading to a desired result, due to their nature and their sequence. A program made according to an embodiment of the invention is most advantageously implemented as a program for a computing machine, such as a general-purpose computer, a special purpose computer, a microprocessor, etc.

The invention also provides storage media that, individually or in combination with others, have stored thereon instructions of a program made according to the invention. A storage medium according to the invention is a computer-readable medium, such as a memory, and is read by the computing machine mentioned above.

The steps or instructions of a program made according to an embodiment of the invention requires physical manipulations of physical quantities. Usually, though not necessarily, these quantities may be transferred, combined, compared, and otherwise manipulated or processed according to the instructions, and they may also be stored in a computer-readable medium. These quantities include, for example electrical, magnetic, and electromagnetic signals, and also states of matter that can be queried by such signals. It is convenient at times, principally for reasons of common usage, to refer to these quantities as bits, data bits, samples, values, symbols, characters, images, terms, numbers, or the like. It should be borne in mind, however, that all of these and similar terms are associated with the appropriate physical quantities, and that these terms are merely convenient labels applied to these physical quantities, individually or in groups.

This detailed description is presented largely in terms of flowcharts, display images, algorithms, and symbolic representations of operations of data bits within at least one computer readable medium, such as a memory. An economy is achieved in the present document in that a single set of flowcharts is used to describe both methods of the invention, and programs according to the invention. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Often, for the sake of convenience only, it is preferred to implement and describe a program as various interconnected distinct software modules or features, individually and collectively also known as software. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network, such as a local access network (LAN), or a global network, such as the Internet.

It will be appreciated that some of these methods may include software steps which may be performed by different modules of an overall parts of a software architecture. For example, data forwarding in a router may be performed in a data plane, which consults a local routing table. Collection of performance data may also be performed in a data plane. The performance data may be processed in a control plane, which accordingly may update the local routing table, in addition to neighboring ones. A person skilled in the art will discern which step is best performed in which plane.

In the present case, methods of the invention are implemented by machine operations. In other words, embodiments of programs of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Methods of the invention are now described.

Figure 5:
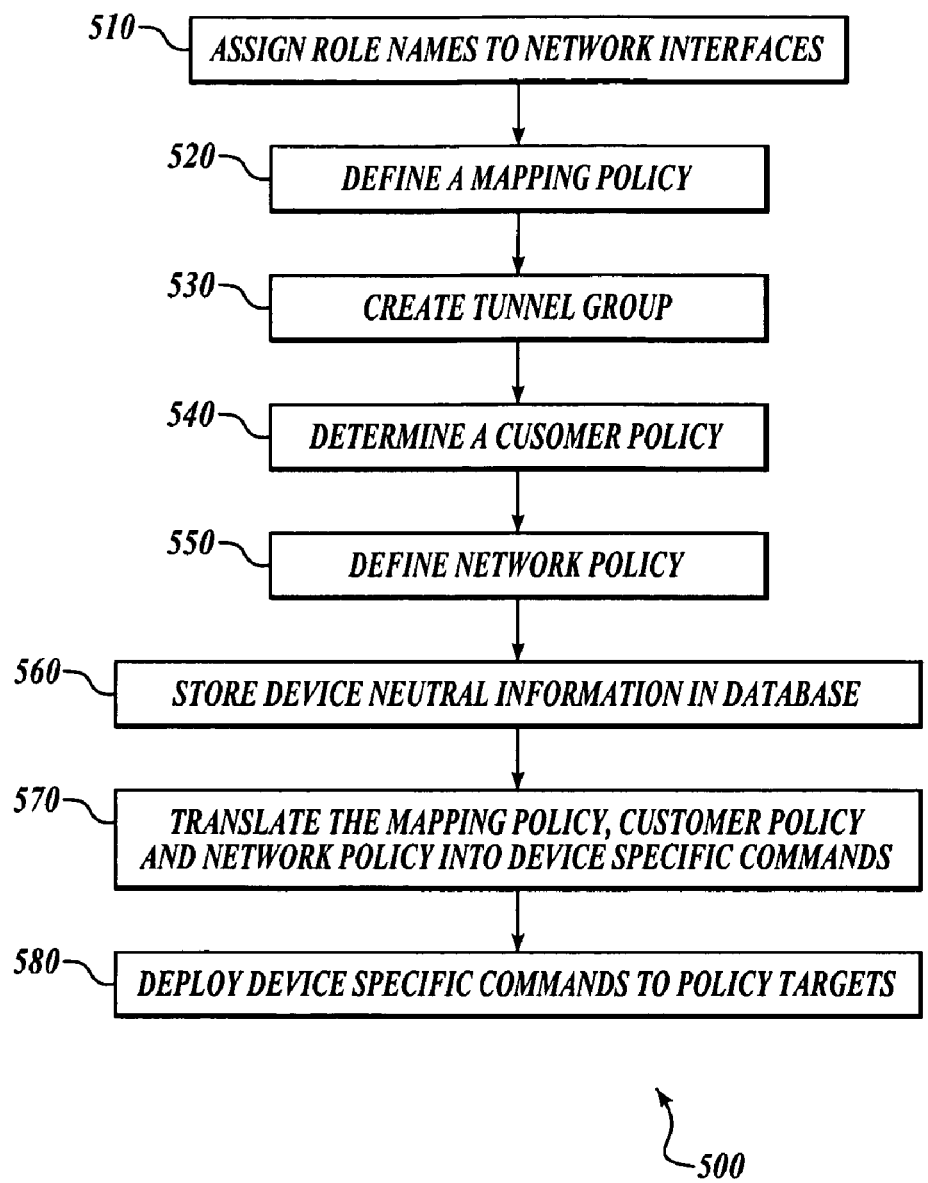
FIG. 5 is a flowchart illustrating a method according to the invention.

FIG. 5 is flowchart 500 illustrating a method according to an embodiment of the invention for configuring policies in a Diffserv/MPLS policy server in a scalable manner. These methods can be practiced by an existing Diffserv policy manager, by an MPLS tunnel manager to support Diffserv over MPLS, and/or other embodiments of the invention.

In flowchart 500, role names are optionally assigned to the network interfaces at block 510. A mapping policy is defined at block 520. The mapping policy is configured to map between an EXP field and a unique PHB. A tunnel group is created at block 530.

A customer policy is determined at block 540. Either it is defined, or an existing one is identified and used. The customer policy defines traffic rules on the network. The customer policy includes information about the tunnel group and a tunneling mode. A network policy is defined at block 550.

At block 560, information is stored in a database. In one embodiment, the information is device neutral. For example, the mapping policy may be stored at a policy server. The tunnel group may also be added to a policy server. Moreover, device neutral information associated with the customer policy may be stored in a policy server database. This way, the defined mapping, customer, and network policies can be maintained.

At block 570, the mapping policy, customer policy and network policy are translated into device specific commands. During the translation, the policy server makes use of the host groups and the application profiles specific to the customer traffic that receives the policy. In one embodiment, the policies are translated from information that has been stored at block 560.

At block 580, the device specific commands are deployed to policy targets, which are the affected network devices. The device-specific commands of the mapping policy are deployed to the ingress interfaces of the MPLS edge devices. If more than one mapping policy exists, each mapping policy is attached to the associated MPLS tunnels and is deployed to the ingress interfaces of the attached tunnels. Customer policies are deployed to the policy targets identified by the input roles, output roles and the MPLS gateways of the customer host groups. Deploying the device specific commands results in implementing the policy across at least part of the network.

Block 580 may be performed a number of ways. One such way is to generate a new configuration file to replace the file currently in use by the network device. The second approach is described below.

Figure 6:
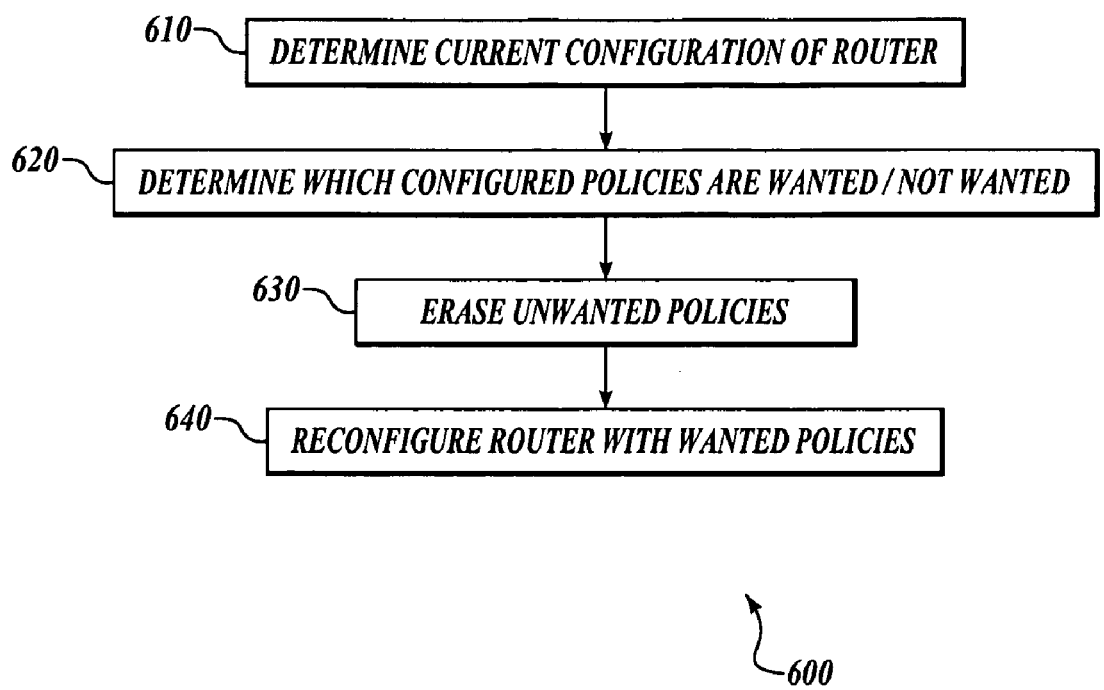
FIG. 6 is a flowchart illustrating another method according to the invention.

FIG. 6 is flowchart 600 illustrating a method according to an embodiment of the invention. The method of flowchart 600 may be practiced by different embodiments of the invention, including but not limited to a policy server.

The current configuration of a router is determined at block 610. The configuration includes information about access lists, classification rules, policies, MPLS tunnels, and the like. Then at block 620 it is determined which configured policies are wanted and which are not. Then at block 630 unwanted policies are erased. Then at block 640 the router is reconfigured by deleting unwanted policies, and replacing them with new command line interface (CLI) commands that the current set of policies has determined to deploy.

Figure 7:
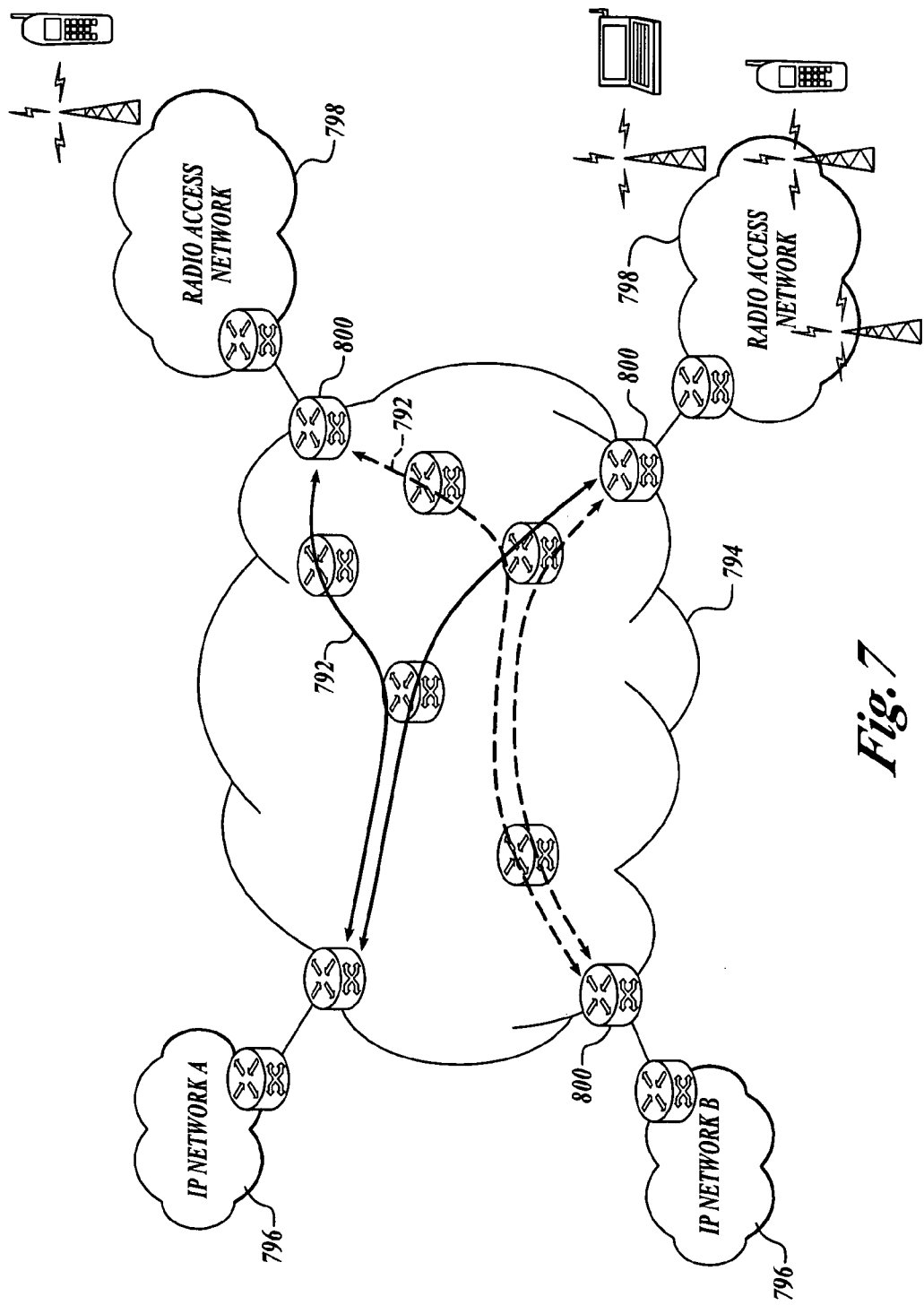
FIG. 7 is a block diagram illustrating the policy server implemented in a 3G network.

FIG. 7 illustrates an example of the policy server implemented in third generation (3G) networks. MPLS tunnels 792 are established across an IP transport network 794, which may include public land mobile networks (PLMN), to provide VPN support. MPLS tunnels 792 provide pathways between IP networks 796 and radio access networks 798. The method provides IP operators with a unified management tool that can configure serving edge routers 800 to support Diffserv/MPLS. According to one embodiment, edge routers 800 include general packet radio service (GPRS) support nodes (SGSN), gateway GPRS support nodes (GGSNs) and third party MPLS routers.

Numerous details have been set forth in this description, which is to be taken as a whole, to provide a more thorough understanding of the invention. In other instances, well-known features have not been described in detail, so as to not obscure unnecessarily the invention.

The invention includes combinations and subcombinations of the various elements, features, functions and/or properties disclosed herein. The following claims define certain combinations and subcombinations, which are regarded as novel and non-obvious. Additional claims for other combinations and subcombinations of features, functions, elements and/or properties may be presented in this or a related document.

The invention claimed is:

1. A system comprising:
    a policy server device that is arranged to configure a customer policy comprising a tunnel mode and a tunnel group identifier,
        configure a mapping policy that maps between an experimental field and a unique per-hop-behavior, and
        send the mapping policy and the customer policy to interfaces of devices of a network that includes multi-protocol label switching tunnels, corresponding to the tunnels, at least one of the network devices comprising an egress interface of one of said multi-protocol label switching tunnels, wherein the interfaces and the customer policy are associated with a same role name.

2. The system of claim 1, wherein the policy server device translates the mapping policy into device specific commands, and sending is performed by deploying commands to specific devices.

3. The system of claim 1, wherein sending is such that the interfaces associate with at least one of input roles, output roles and multi-protocol label switching gateways of customer source and destination host groups.

4. An apparatus comprising:
    a memory;
    a service application residing on the memory,
        wherein the service application is arranged to configure a customer policy that comprises a tunnel group identifier and tunneling mode, the customer policy being arranged to have customer traffic mapped into multi-protocol label switching tunnels corresponding to the tunnel group identifier, and
        wherein the service application is arranged to configure an experimental-to-per-hop-behavior mapping policy that is arranged to map experimental fields to per-hop-behavior;
    a central processing facility that is arranged to translate the customer policy and mapping policy into device-neutral policy parameters; and
    a policy consumer that is arranged to translate the device-neutral policy parameters into device-specific commands, and send the device-specific commands to policy targets, such that the customer policy and mapping policy are implemented across at least a portion of the network, wherein each policy target comprises a network device, at least one of the network devices comprising an egress interface of said tunnel group.

5. The apparatus of claim 4, further comprising:
    a user interface that is arranged to receive the customer policy and the mapping policy.

6. The apparatus of claim 4, wherein sending is such that the interfaces associate with at least one of input roles, output roles and multi-protocol label switching gateways of customer source and destination host groups.

7. The apparatus of claim 4, wherein
    the policy consumer is further arranged to attach the customer policy to the corresponding multi-protocol label switching tunnels and deploy the customer policy to interfaces of the attached multi-protocol label switching tunnels.

8. The apparatus of claim 4, further comprising: a database for storing the device-neutral policy parameters.

9. The apparatus of claim 4, wherein
    the service application comprises a tunnel group object that is arranged to create the multi-protocol label switching tunnels by specifying end-point routers and inter-connecting topology.

10. An apparatus comprising a processor with:
    defining means for defining a mapping policy that maps between an experimental field and a unique per-hop-behavior;
    maintaining means for maintaining a customer policy, the customer policy comprising a tunneling mode and a tunnel group identifier;
    a translating means for translating the mapping policy, the network policy and customer policy into device-specific commands; and
    sending means for sending the device-specific commands to policy targets, wherein each policy target comprises a network device that includes an interface that is associated with a role name that is also associated with the customer policy, said interfaces including an egress interface of at least one of multi-protocol label switching tunnels.

11. The apparatus of claim 10, wherein sending is such that the interfaces associate with at least one of input roles, output roles and multi-protocol label switching gateways of customer source and destination host groups.

12. An article comprising: a storage medium, the storage medium having instructions stored thereon, wherein when the instructions are executed by at least one device, they result in:
    defining a mapping policy that maps between an experimental field and a unique per-hop-behavior;
    defining a customer policy comprising a tunneling mode and a tunnel group identifier the customer policy being configured to govern the treatment of individual customer traffic;

defining a network policy that is configured to define the Diffserv treatment of aggregated traffic;

translating the mapping policy, the network policy and the customer policy into device-specific commands; and deploying the device-specific commands to policy targets, wherein each policy target comprises a network device that includes an interface that is assigned a role name associated with the customer policy, at least one interface comprising an egress interface of at least one multi-protocol label switching tunnel.

13. The article of claim 12, wherein executing the instructions further results in:

generating device neutral information associated with the mapping policy, the network policy and the customer policy.

14. The article of claim 13, wherein the device specific commands are generated from the device neutral information.

15. The article of claim 13, wherein executing the instructions further results in: storing the device neutral information in a database.

16. The article of claim 12, wherein deployment is such that the interfaces associate with at least one of input roles, output roles and multi-protocol label switching gateways of customer source and destination host groups.

17. The article of claim 12, wherein deploying the mapping policy to the network interfaces further comprises issuing new commands to reconfigure a router based on the mapping policy.

18. A method comprising:

defining a mapping policy configured to map between an experimental field and a unique per-hop-behavior;

defining a customer policy comprising a tunneling mode and a tunnel group identifier, the customer policy being configured to govern the treatment of individual customer traffic;

defining a network policy that is configured to define the Diffserv treatment of aggregated traffic;

translating the mapping policy, the network policy and the customer policy into device-specific commands; and sending the device-specific commands to policy targets, wherein each policy target comprises a network device that includes an interface assigned a role name associated with the customer policy, at least one of the interfaces comprising an egress interface of one of multi-protocol label switching tunnels.

19. The method of claim 18, further comprising:

generating device neutral information associated with the mapping policy, the network policy and the customer policy.

20. The method of claim 19, wherein the device specific commands are generated from the device neutral information.

21. The method of claim 19, further comprising: storing the device neutral information in a database.

22. The method of claim 18, wherein sending is such that the interfaces associate with at least one of input roles, output roles and multi-protocol label switching gateways of customer source and destination host groups.

23. The method of claim 18, wherein sending the mapping policy to the network interfaces further comprises issuing new commands to reconfigure a router based on the mapping policy.

* * * * *